United States Patent [19]

Ray-Chaudhuri et al.

[11] 3,917,691

[45] Nov. 4, 1975

[54] PERFLUORO ALKYL SULFONAMIDES USEFUL AS WATER AND OIL REPELLENCY AGENTS

[75] Inventors: Dilip K. Ray-Chaudhuri, Somerville; Carmine P. Iovine, Somerset, both of N.J.

[73] Assignee: National Starch and Chemical Corporation, Bridgewater, N.J.

[22] Filed: Nov. 12, 1973

[21] Appl. No.: 414,870

Related U.S. Application Data

[60] Division of Ser. No. 278,957, Aug. 9, 1972, Pat. No. 3,810,939, which is a continuation-in-part of Ser. No. 18,720, March 11, 1970, abandoned, which is a continuation-in-part of Ser. No. 755,814, Aug. 28, 1968, abandoned.

[52] U.S. Cl. ...... 260/556 F; 260/513 R; 260/543 R
[51] Int. Cl.² ........................................ C07C 143/72
[58] Field of Search ................................ 260/556 F

[56] References Cited
UNITED STATES PATENTS

3,829,466    8/1974    Staffe et al. ................ 260/556 F X 3,864,396    2/1975    Staffe et al. ................ 260/556 F

FOREIGN PATENTS OR APPLICATIONS

2,002,460    7/1970    Germany .................... 260/556 F

*Primary Examiner*—Daniel E. Wyman
*Assistant Examiner*—Thomas A. Waltz
*Attorney, Agent, or Firm*—Thomas B. Graham

[57] ABSTRACT

Segmented fluorocarbon sulfonic acids comprising the reaction product of a perfluoroalkyl-alkyl halide and a sulfonation reagent as well as the acid anhydrides, metal salts, sulfonyl halides and sulfonamides thereof. The resulting compositions possess unique surface active properties and thus are applicable as effective emulsifying agents. They may also be used as intermediates in the preparation of water and oil repellency agents.

6 Claims, No Drawings

PERFLUORO ALKYL SULFONAMIDES USEFUL AS WATER AND OIL REPELLENCY AGENTS

RELATED APPLICATIONS

This application is a division of our copending application Ser. No. 278,957 filed Aug. 9, 1972, now U.S. Pat. No. 3,810,939 which, in turn, is a continuation-in-part of Ser. No. 18,720 filed Mar. 11, 1970, now abandoned, which, in turn, was a continuation-in-part of Ser. No. 755,814 filed Aug. 28, 1968, now abandoned, and assigned to the assignee of the instant application.

SUMMARY OF THE INVENTION

It is the object of this invention to prepare novel segmented fluorocarbon sulfonic acids and various derivatives thereof. Other objects and advantages of this invention will become apparent to the practitioner from the following description.

Thus, the compositions of this invention comprise the novel segmented fluorocarbon sulfonic acids corresponding to the formula

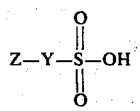

wherein Z is a radical containing from 3 to 20 carbon atoms inclusive and is
  selected from the group consisting of straight and branched chain perfluoro alkyl radicals, and
  Y is a radical selected from the group consisting of alkylene, alkenylene, cyclo alkylene, bridged cyclo alkylene and ar-arkylene radicals.

Also included within the scope of this invention are the derivatives of the specified fluorocarbon sulfonic acids including for example,
  a. anhydrides of these acids corresponding to the formula $(Z - Y - SO_2)_2O$;
  b. metal and ammonium salts of these acids corresponding to the formula $(Z - Y - SO_3)_a{}^-M^{+a}$ wherein M is a metal atom or an ammonium group and a is the number of sulfonyl groups coordinated with said metal or ammonium group and, correspondingly, the valence of said metal or ammonium group;
  c. sulfonyl halides of these acids corresponding to the formula $Z - Y - SO_2X$ wherein X is a halogen atom selected from the group consisting of chlorine, bromine, and iodine atoms; and;
  d. sulfonamides of these acids corresponding to the formula $Z - Y - SO_2 - NR_2$ wherein R is selected from the group consisting of hydrogen atoms and alkyl radicals; the "Z" and "Y" components of these derivatives being as previously described.

It will thus be seen that the novel sulfonic acid materials of this invention are basically four component compositions wherein the fluorocarbon group (Z) is linked to the sulfur atom of the sulfonyl group via a hydrocarbon radical (Y), herein referred to as the "segmented" group, and, the sulfur atom is linked, in turn, to either a hydroxyl group (acids), an oxygen atom (anhydrides), a metal atom (salts), a halogen atom (sulfonyl halides) or, a nitrogen atom (sulfonamides).

DESCRIPTION OF THE PREFERRED EMBODIMENT

In brief, the procedure for preparing the novel composition of this invention ordinarily comprises reacting:
  1. a perfluoroalkyl-alkyl halide with
  2. a sulfonation reagent; and thereafter, if desired, derivatizing the reaction product to any corresponding form.

However, perfluoroalkyl olefins and perfluoro alkyl substituted aromatic hydrocarbons can also be used in place of the perfluoroalkyl-alkyl halide.

The perfluoroalkyl-alkyl halides applicable for use in the preparation of the novel compositions of this invention correspond to the formula [Z—Y—W] wherein Z and Y are as previously described and W is a halogen atom selected from the group consisting of chlorine, bromine and iodine atoms.

Thus, among the applicable perfluoroalkyl-alkyl halides are included: 1-iodo-2-perfluoroheptyl-ethane, i.e. $C_7F_{15}CH_2CH_2I$; 1-iodo-4-perfluoropropyl-n-butane, i.e. $C_3F_7(CH_2)_4I$; 1-bromo-11-perfluoroheptyl-n-undecane, i.e. $C_7F_{15}(CH_2)_{11}Br$; 2-perfluoroheptyl-5-bromomethyl-norbornane; 1-iodo-4-perfluoroheptyl-2-butene, i.e. $C_7F_{15}CH_2—CH=CH—CH_2I$; 1-bromo-11-perfluoroheptyl-10-undecene, i.e. $C_7F_{15}CH=CH(CH_2)_8CH_2Br$; and, 1-iodo-2-perfluoropropyl-ethane, i.e. $C_3F_7CH_2CH_2I$.

Methods for preparing these perfluoroalkyl-alkyl halides are well known to those skilled in the art (see U.S. Pat. Nos. 2,965,659 and 3,145,222). Typical preparative procedures include the addition reaction of perfluoroalkyl iodides and bromides with terminal olefins, and the addition reaction of perfluorosulfonyl chlorides with terminal olefins. Where these procedures result in the preparation of secondary halides, such halides may be converted into the primary halide prior to sulfonation, or, may be sulfonated directly, as by means of the procedures hereinafter described.

The sulfonation procedures which may be utilized to prepare the novel compositions of this invention are also well known to those skilled in the art. Among the sulfonation reagents that are used in these procedures are included alkali metal sulfites, alkali metal bisulfites, sulfuric acid, sulfur dioxide, sulfuryl chloride and chlorosulfonic acid. In a typical procedure, which is preferred for purposes of this invention because of its efficiency and economy, one mole of the perfluoroalkyl-alkyl halide is admixed with from about one to two moles of an alkali metal sulfite and, thereafter, heated to a temperature of from about 100° to 200°C. for a period of about 1 to 30 hours. The reaction is conducted either in water or in a mixture of water and a water miscible organic solvent such, for example, as ethyl alcohol, isopropyl alcohol, dimethyl formamide and dimethyl sulfoxide. The fluorocarbon sulfonic acid product is isolated as the alkali metal sulfonate which may, thereafter, be converted into the corresponding sulfonic acid or any other desired derivative.

Additional sulfonation procedures which may be utilized include: (1) the reaction of the fluoroalkyl-alkyl bromide and magnesium metal to produce a Grignard-type magnesium bromide reagent and the subsequent reaction of this reagent with sulfur dioxide and chlorine gas to produce the fluoroalkyl-alkyl sulfonyl chloride; (2) the reaction procedure whereby the fluoroalkyl-alkyl halide is first converted into the corresponding alcohol which, in turn, is reacted with sulfuric acid in the presence of a neutralization agent, such as sodium hydroxide, potassium hydroxide and sodium carbonate, to produce the fluoroalkyl-alkyl sulfate salt; the resulting salt then being reacted with an alkali metal sulfite to produce the desired fluoroalkyl-alkyl sodium sulfonate salt; (3) the reaction of the fluoroalkyl-alkyl halide with thiourea or an alkali metal thiocyanate to produce respectively the S-alkyl isothiouronium hydrohalide salt or thiocyanate; these compounds can be converted directly into the sulfonyl chloride by treatment with aqueous chlorine; and (4) the direct sulfonation of a fluoroalkyl-alkyl substituted aromatic hydrocarbon with chlorosulfonic or sulfuric acid. Further information relating to the applicable sulfonation reactions may be obtained by referring to "Sulfonation and Related Reactions", by E. E. Gilbert, published in 1965 by Interscience Publishers, New York, New York.

Conversion of the novel compositions of this invention into the corresponding acids, metal salts, anhydrides, sulfonyl halides and sulfonamides may be accomplished by means of well known derivatization techniques. Thus, the fluoroalkylalkyl sulfonic acids may be converted into metallic salts by reacting the acid with a metallic oxide, hydroxide, carbonate, etc., e.g. sodium carbonate, calcium oxide, potassium hydroxide, barium chloride and silver nitrate. The anhydrides of these acids may be prepared by heating the acid with a stoichiometric excess of phosphorus pentachloride. The sulfonyl halides may be prepared by interaction of the acid with approximately an equimolar concentration of a phosphorus halide such, for example, as phosphorus pentachloride. The resulting sulfonyl halides may, in turn, be reacted with liquid ammonia, gaseous ammonia, ammonium carbonate or various amine compounds in order to prepare the corresponding sulfonamides. Furthermore, where a sulfonate salt is directly prepared by the sulfonation reaction, it may be converted into the acid form by means of a decomposition technique using dry gaseous hydrogen chloride in an appropriate solvent.

it should be noted that the novel compositions of this invention may be utilized in preparing additional fluoroalkyl-alkyl derivatives such, for example, as amine salts, sulfones sulfonic acid esters, substituted sulfonamides and chloroamides.

As previously noted, these novel sulfonic acid compositions exhibit unique surface active properties. Thus, these materials are effective in reducing the surface tension properties of both aqueous and non-aqueous systems. Their unique characteristics enable them to be used as wetting agents, surface tension reducing agents, foaming agents, anti-foaming agents, dispersing agents, emulsifying agents, emulsion and dispersion stabilizers, detergents, corrosion inhibitors and fluxes, etc.

Furthermore, polyvalent sulfonate salts, e.g. $(C_7F_{15}CH_2CH_2SO_3)_2^-Ca^{+2}$, may be utilized to impart water and oil repellent properties to paper and paper products. Thus, such materials may be applied to paper from water - alcohol solutions by means of conventional tube and calender – stack sizing techniques as well as by any other means which is capable of effectively depositing a small concentration of the repellent on the paper. The novel derivatives may, of course, be successfully utilized for the sizing of paper prepared from all types of both cellulosic and combinations of cellulosic and non-cellulosic fibers. The cellulose fibers which may be used include bleached and unbleached sulfate (kraft), bleached and unbleached sulfite, bleached and unbleached soda, neutral sulfite, semichemical, chemi-groundwood, ground wood, and any combination of these fibers. In addition, synthetic fibers of the viscose rayon or regenerated cellulose type as well as of the chemically synthesized type can also be used. It should be noted that as little as about 0.1 percent of the repellent, based on the dry weight of the pulp in the finished sheet, is sufficient to provide effective water and oil repellency.

The novel sulfonic acid compositions of this invention may also be used as intermediates in the preparation of water and oil repellency agents which are applicable for use on a wide variety of substrates.

The following examples will further illustrate the embodiment of this invention. In these examples, all parts given are by weight, unless otherwise noted.

EXAMPLE I

This example illustrates the preparation of a fluoroalkyl-alkyl sodium sulfonate salt by means of an aqueous sulfite reaction technique.

A pressurized reaction vessel was charged with 38 parts of 1-iodo-2-perfluoropropyl-ethane, 22 parts of anhydrous sodium sulfite, 40 parts of water, and 30 parts of ethyl alcohol. The temperature of the reaction system, which was in emulsion form, was raised to 120°–125°C. over a period of four hours and the reaction allowed to proceed at this temperature and a pressure of 95 psi for an additional 16 hours. The reactor contents were then cooled and filtered.

Upon recrystallization of the solid product, a 76.5 percent yield of sodium-(2-perfluoropropyl)ethane sulfonate was recovered in the form of white platelets which melted at a temperature in excess 250°C. and which exhibited slight solubility in both water and ethyl alcohol.

It should be noted that this reaction is suitable for preparing any of the sodium sulfonate reaction products in accordance with this invention. Thus, comparable sodium sulfonate salts may be produced by replacing the above described fluoroalkyl-alkyl halide, in the reaction system, with any of the following fluoroalkyl-alkyl halides:

(a) 1-iodo-4-perfluoropropyl-n-butane;
(b) 1-iodo-11-perfluoroheptyl-n-undecane;
(c) 1-bromo-11-perfluoroheptyl-n-undecane;
(d) 2-perfluoroheptyl-5-bromomethyl-norbornane; and
(e) 1-iodo-4-perfluoroheptyl-2-butene.

EXAMPLE II

This example illustrates the preparation of additional fluoroalkyl-alkyl sodium sulfonate salts typical of the novel products of this invention.

A number of different fluoroalkyl-alkyl sodium sulfonate salts were prepared according to the general procedure set forth in Example I, hereinabove, utilizing a variety of reagents at different concentration levels under varying reaction conditions. These variables are described in the following table.

TABLE

|  | Salt No. parts | | | | |
| --- | --- | --- | --- | --- | --- |
|  | No. 1 | No. 2 | No. 3 | No. 4 | No. 5 |
| 1-iodo-2-perfluoroheptyl-ethane | 52.4 | — | — | — | — |
| 1-iodo-4-perfluoroheptyl-n-butane | — | 15.0 | — | — | — |
| 1-bromo-11-perfluoroheptyl-n-udecane | — | — | 17.0 | — | — |
| 1-bromo-11-perfluoroheptyl-10-undecene | — | — | — | 23.0 | — |
| 2-perfluoroheptyl-5-bromo-methyl-norbornane | — | — | — | — | 14.0 |
| anhydrous sodium sulfite | 19.0 | 4.1 | 8.5 | 5.8 | 3.8 |
| water | 45 | 20 | 40 | 30 | 20 |
| ethyl alcohol | 35.0 | 15.8 | 31.6 | 27.0 | 17.0 |
| reaction temperature (°C.) | 120 | 160–5 | 130 | 120 | 125 |
| reaction time (hours) | 21 | 6 | 21 | 18 | 18 |
| product yield (%) | 85 | 56 | 69 | 56.3 | 18 |
| melting point (°C.) | 240–245 | 242–247 | 218–223 | 213–220 | 296–300 |

EXAMPLE III

This example illustrates a procedure for converting a fluoroalkyl-alkyl sodium sulfonate salt into its corresponding sulfonic acid.

A reaction vessel fitted with a gas inlet tube, a distillation apparatus and means for mechanical agitation was charged with 50 parts of diethyl ether and 5 parts of sodium-(4-perfluoroheptyl) butane sulfonate; the latter fluoroalkyl-alkyl sodium sulfonate salt having been prepared according to the procedure set forth in Example II-2. The resulting suspension was maintained at room temperature and subjected to vigorous agitation whereupon dry gaseous hydrogen chloride was passed through the system for a period of 3 hours.

Upon completion of the decomposition reaction, the ether was removed from the system and the resulting product was washed several times with portions of fresh ether in order to remove the residual hydrogen chloride. The crude sulfonic acid was then vacuum dried and recrystallized from benzene thereby yielding a white crystalline fluoroalkyl-alkyl sulfonic acid which melted at 102°–106°C. and which was soluble in water.

EXAMPLE IV

This example illustrate a procedure for converting a fluoroalkyl-alkyl sodium sulfonate salt into its corresponding sulfonyl chloride.

A reaction vessel fitted with a distillation apparatus and means for mechanical agitation was charged with 20 parts of sodium-(2-perfluoroheptyl)ethane sulfonate, which was prepared according to the general procedure set forth in Example II-1, and 16.7 parts of phosphorus pentachloride. An exothermic reaction occurred immediately and was accompanied by a brief period of phosphorus oxychloride reflux. Upon cessation of the exothermic reaction, the mixture was heated at 50°–60°C. for a period of 2 hours.

Thereafter, the reaction mixture was poured over 500 parts of cracked ice, thoroughly dispersed therein by means of vigorous agitation, and filtered. This procedure was repeated several times until the filtrate exhibited a neutral pH. The product was then dried, dissolved in acetone and filtered free of unconverted fluoroalkyl-alkyl sodium sulfonate. Upon removing the acetone, an 86 percent yield of the corresponding fluoroalkyl-alkyl sulfonyl chloride was recovered in the form of a white solid which melted at 39°–42°C. and which was soluble in heptane, benzene, ether and acetone.

EXAMPLE V

This example illustrates a procedure for the conversion of a fluoroalkyl-alkyl sulfonyl chloride into its corresponding sulfonamide.

A reaction vessel fitted with a gas inlet tube, a distillation apparatus and means for mechanical agitation was charged with 40 parts of benzene and 13 parts of 2-perfluoroheptyl-ethane sulfonyl chloride, as prepared in Example IV. Anhydrous ammonia gas was then passed into the system at a rate which was sufficient to maintain the temperature of the system between 40°C. and 50°C. This procedure was continued for 30 minutes whereupon the reaction product was filtered and washed with water to remove the residual ammonium chloride. The product was then dried and recrystallized from water thereby producing an 80 percent yield of a white solid fluoroalkyl-alkyl sulfonamide which melted at 98°–104°C.

EXAMPLE VI

This example illustrates the preparation of an aromatic fluoroalkyl-alkyl sulfonic acid derivative.

A reaction vessel fitted with a reflux condenser, slow addition funnel, moisture trap, thermometer and means for mechanical agitation was charged with 9.3 parts of chlorosulfonic acid to which was added over a period of 60 minutes, 13 parts of 1-phenyl-3-perfluoroheptyl-n-propane. The reaction was exothermic, and the addition rate was so regulated that the reaction temperature did not exceed 35°C. After the addition was completed, the reaction mixture was stirred for an additional period of 1 hour at room temperature, and thereafter the mixture was slowly poured over cracked ice. The fluorocarbon product was collected and dissolved in diethyl ether. The ether solution was washed with water until the wash water was neutral to litmus and dried over sodium sulfate. Upon removing the solvent, the sulfonyl halide p-(1H,1H,2H,2H,3H,3H-perfluorodecyl) benzene sulfonyl chloride, was obtained in the form of a viscous yellow oil (13 parts or 84% yield) and was thereafter converted into the corresponding sulfonamide which melted at 101°–106°C.

EXAMPLE VII

This example illustrates the preparation of 1-bromo-11-perfluoroheptyl-n-undecane which was used as the starting material for a compound illustrated in Example II.

Part A:

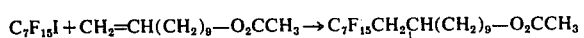

$C_7F_{15}I + CH_2=CH(CH_2)_9—O_2CCH_3 \rightarrow C_7F_{15}CH_2CH(CH_2)_9—O_2CCH_3$
                                                                    $|$
                                                                    $I$ A reaction vessel as used in the previous examples was charged with 0.15 gm of α, α' azobisisobutyronitrile, 49.6 gm (0.1 mole) perfluoroheptyl iodide and 21.6 gm (0.102 mole) undec-10-enyl acetate. The reaction mixture was vacuum degassed using conventional freeze thaw techniques and left under positive nitrogen pressure. The mixture was thereafter heated to 85°–90°C. and an additional 0.15 gm of azobisisobutyronitrile in 5 ml of t-butanol was "slow added" over a period of 3 hours. Residual $C_7F_{15}I$ was removed on completion of the heating period to yield crude 11-perfluoroheptyl-10-iodo-undecyl-1-acetate. The conversion was found to be 91%.

Part B:

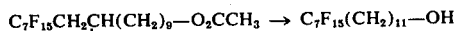

$C_7F_{15}CH_2CH(CH_2)_9—O_2CCH_3 \rightarrow C_7F_{15}(CH_2)_{11}—OH$
              $|$
              $I$ A reaction vessel as used in the previous examples was charged with 30 gm of the product of Part A, 100 ml of anhydrous ethanol and 4 gm of granular zinc. The mixture was saturated with dry hydrogen chloride and thereafter heated to 75°C. After heating for 1 hour at 75°C. an additional 4 gm of zinc was added to the reaction mixture and heating was continued for 5 hours. The mixture was periodically resaturated with dry hydrogen chloride so that an excess of hydrogen chloride was present throught the entire heating period.

At the completion of the heating period, the hot reaction mixture was filtered to remove unreacted zinc. The filtrate was poured into 400 ml of distilled water and the oil layer was separated and dissolved in diethyl ether. The ether solution was then washed free of acid using an aqueous solution of sodium hydroxide (3%) and dried over sodium sulfate. The dried ether solution was fractionally distilled to yield 11-perfluoroheptyl undecane-1-ol. 23.2 gm (87% yield) m.p. 50°–53°C., b.p. 140°–145°C/0.4 mm Hg.

Part C $3C_7F_{15}(CH_2)_{11}OH + PBr_3 \rightarrow 3C_7F_{15}(CH_2)_{11}Br$

A reaction vessel equipped with a stirrer, condenser with drying tube and thermometer, was charged with 23 gm (0.04 moles) of the product of Part B and 15 ml of dry pyrridine. At 20°C., 8.3 gm of phosphorus tribromide (0.03 moles) was introduced into the reaction vessel. The reaction mixture exothermed to 40°C. and was held at 35°–40°C. by means of external cooling. When the exotherm of the mixture subsided, infrared analysis of the crude reaction mixture indicated complete conversion of the alcohol to the brominated compound, (no absorption at 3.0μ).

The reaction mixture was thereafter poured onto cracked ice and drowned with 200 ml of water. The heavy oil which separated was collected, dissolved in ether and washed with water until the wash water was neutral. The ether solution was dried over sodium sulfate, filtered, and vacuum distilled to strip the ether. The yield of purified 1-bromo-11-perfluoroheptyl-n-undecane was 25 gm (97%).

EXAMPLE VIII

This example illustrates the preparation of 1-bromo-11-perfluoroheptyl-10-undecene which was used as the starting material for a compound illustrated in Example II.

Part A:

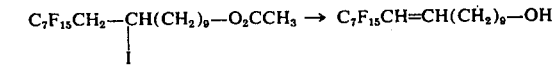

$C_7F_{15}CH_2—CH(CH_2)_9—O_2CCH_3 \rightarrow C_7F_{15}CH=CH(CH_2)_9—OH$
               $|$
               $I$ In a suitable reaction vessel, 30 gm (approx. 0.05 mole) of crude 11-perfluoroheptyl-10-iodo-undecyl-1-acetate, the product of Part A, Example VII, dissolved in 30 ml of ethanol, was added at room temperature to a solution of 8.4 gm of potassium hydroxide in 40 ml of a 3:1 mixture of ethanol and water. The resultant reaction mixture was stirred and refluxed at 76°C. for a period of 3 hours. The crude hydrolysate was thereafter poured into 400 ml of water and the oil layer was separated and dissolved in diethyl ether. The ether solution was washed with water until neutral and dried over sodium sulfate and filtered. The dried ether solution was fractionally distilled to yield 11-perfluoroheptyl-10-undecene-1-ol, 23.9 gm (86% yield) colorless liquid, b.p. 135°–140°C./0.5 mm Hg. The product showed a strong absorption at 3μ (indicating -OH) and at 6μ (indicating —CH=CH—).

Part B: $C_7F_{15}CH=CH(CH_2)_9—OH + PBr_3 \rightarrow C_7F_{15}CH=CH(CH_2)_9—Br$ Following the identical procedure of Part C of Example VII, 19.9 gm of the purified 11-perfluoroheptyl-10-undecene-1-ol prepared in Part A of this Example was converted into 1-bromo-11-perfluoroheptyl-10-undecene, 16.1 gm (72.6% yield).

Summarizing, it is thus seen that this invention provides for the preparation of a novel class of segmented fluorocarbon sulfonic acids and derivatives thereof.

Variations may be made in proportions, procedures and materials without departing from the scope of this invention which is defined by the following claims.

What is claimed is:

1. A water and oil repellency agent consisting of the sulfonamides corresponding to the formula

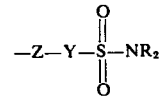

$$-Z-Y-\overset{\overset{O}{\|}}{\underset{\underset{O}{\|}}{S}}-NR_2$$

wherein
R is selected from the group consisting of hydrogen atoms and alkyl radicals and wherein
Z is a radical containing from 3 to 20 carbon atoms inclusive and is selected from the group consisting of straight and branched chain perfluoro alkyl radicals; and Y is a radical containing from 2 to 11 carbon atoms selected from the group consisting of alkylene and alkenylene radicals.

2. A compound in accordance with claim 1: 2-perfluoropropyl-ethane sulfonamide.

3. A compound in accordance with claim 1: 2-perfluoroheptyl-ethane sulfonamide.

4. A compound in accordance with claim 1: 4-perfluoroheptyl-butane sulfonamide.

5. A compound in accordance with claim 1: 11-perfluoroheptyl-undecane sulfonamide.

6. A compound in accordance with claim 1: 11-perfluoroheptyl-10-undecene sulfonamide.

* * * * *